Patented Nov. 21, 1950

2,531,284

UNITED STATES PATENT OFFICE 2,531,284

PRODUCTION OF ALCOHOLS

Norman Levy and Robert Kay Greenhalgh, Norton-on-Tees, England, assignors to Imperial Chemical Industries Limited, a corporation of Great Britain No Drawing. Application July 22, 1947, Serial No. 762,795. In Great Britain August 16, 1946

3 Claims. (Cl. 260—641)

This invention relates to the production of alcohols.

In an investigation of the hydration of olefines in the presence of tungsten-containing catalysts we have found operating conditions with which particularly satisfactory yields of butanols can be obtained from the corresponding butenes while avoiding the formation of undesired by-products, such as polymers.

According to the present invention tertiary butanol is produced by reacting, at a temperature in the range of from 160° C. to 220° C., water and isobutene in the presence of a catalyst containing the oxide of tungsten known as blue oxide and which has a formula approximating to $W_2O_5$). Within the hereinbefore defined temperature range we prefer to operate at a temperature of about 200° C.

A further feature of the present invention is in the production of secondary butanol by reacting at a temperature within the range of from 230° C. to 270° C., and preferably at a temperature of about 250° C., water and butene-1 and/or butene-2 in the presence of the catalyst htreinbefore defined.

A wide range of butene rates may be used in the hereinbefore defined processes without undue polymer formation occurring.

In the hydration of isobutene, polymer formation can be minimised either by carrying out the process at the lower temperatures or in a continuous process by the use of high feed rates, for example, with a molecular ratio of water to isobutene of 3:1, of from 0.5 kg. to 2.0 kg. of isobutene per hour per litre of catalyst contained in the reaction vessel, when operating at the higher temperatures. In general, with a molecular ratio of water to isobutent of 3:1, rates of from 1.0 kg. to 2.0 kg. of isobutene per hour per litre of catalyst contained in the reaction vessel give satisfactory results. When n-butenes are being hydrated, there is less tendency for polymer formation to occur and rates of 0.5 kg. of n-butenes per hour per litre of catalyst contained in the reaction vessel give satisfactory results.

While in the processes hereinbefore defined, stoichiometric quantities of water and olefine may be used according to the equation:

$$C_4H_8 + H_2O \rightarrow C_4H_9OH$$

i. e., a molecular ratio of water to olefine of 1:1, we have found that the tendency to polymer formation is decreased as molecular ratios of water to olefine higher than 1:1 are used, for example, 3:1. Molecular ratios of water to olefine as high as 20:1 may be used if desired. With these higher ratios it is desirable to decrease the rate of feed of the olefine when higher conversions are required.

The process of the present invention is preferably operated as a continuous process in which butylene and water are passed over the tungsten oxide catalyst maintained at a temperature within the appropriate range, as hereinbefore defined, corresponding to the butylene being used, and after separating the aqueous reaction products the unreacted butylene is returned to the process. When operating as a continuous process the reactants may be passed at any convenient rate over the heated catalyst.

Suitable catalysts may be prepared by a variety of methods. For example, a powdered mixture of tungstic acid ($WO_3$) with about 2% of its weight of graphite may be formed into pellets of a suitable size. Before being used in the reaction step, the pellets thus prepared may be reduced by any convenient means to produce the blue oxide of tungsten. For example they may be reduced by treatment at elevated temperature with hydrogen, carbon monoxide or mixtures containing these gases. A preferred method is to carry out the reduction step by treating the pellets at elevated temperature with a lower monohydric alcohol, which preferably contains not more than four carbon atoms, such reduction treatment being continued for a suitable period, which may be 3 hours, followed if desired by a treatment with water, also at elevated temperature. This method of reduction is conveniently carried out in the reaction vessel, under substantially atmospheric pressure. Alternatively, the pellets may be charged, without previous reduction, into the reaction vessel and treated at elevated temperature with the reactants, whereby the blue oxide of tungsten is formed. As an alternative to tungstic acid in the preparation of the above-mentioned catalyst, ammonium paratungstate may be used, in which case, because ammonia is liberated, when the pellets are exposed to elevated temperature, it is desirable to subject the pellets to a reduction treatment at elevated temperature in a separate step.

As an additional feature of the present invention there is provided a process for the production of alcohols from the corresponding butenes which comprises passing a mixture containing isobutene, either or both n-butenes and water over the catalyst containing the blue oxide of tungsten at a temperature in the range of from 160° C. to 220° C., separating tertiary butanol from the reaction products and passing the residual butene-containing mixture, after adding further quantities of water if desired, over a second catalyst containing the blue oxide of tungsten at a temperature within the range of from 230° C. to 270° C. to produce secondary butanol.

The products of the reaction may be treated by any convenient means for the recovery of butanol. In general this recovery will include cooling the reacted materials to obtain an aqueous product containing butanol, which may then be treated for the recovery of dry butanol by any convenient method.

Example 1

A catalyst was prepared by forming powdered tungstic acid containing 2% of its weight of graphite into cylindrical pellets $\frac{3}{16}''$ by $\frac{3}{16}''$. 0.75 litre of these pellets was charged into a reaction vessel and treated with ethanol for 3 hours followed by treatment with water for 3 hours, the temperature being maintained at 250° C. during these treatments. Subsequently isobutene at a rate of 1.23 kg. per hour and water at 1.31 kg. per hour were passed over this catalyst while maintaining the temperature at 201° C. and the pressure at 250 atmospheres. Of the isobutene fed 14.3% was converted into tertiary butanol and 0.3% was converted into isobutene polymers.

The total conversion of isobutene fed was thus 14.6% and the yield of tertiary butanol on isobutene converted was 98%.

Example 2

3 liters of catalyst prepared as described in Example 1 were charged into a reaction vessel, into which 0.805 kg. per hour of butene-2 and 0.745 kg. per hour of water were passed, the temperature being maintained at 230° C. and the pressure at 250 atmospheres. Of the butene-2 fed, 8.4% was converted to secondary butanol and 0.4% to butene polymers. The total conversion of butene-2 was thus 8.8% and the yield of secondary butanol on the butene converted was 95%.

It should be understood that the process of the present invention may be carried out at any desired pressure. We have found it convenient to operate at a pressure of about 250 atmospheres.

We claim:

1. A process for the production of tertiary butanol which comprises the steps of reacting water and isobutene at a temperature within the range of 160°–220° C. and pressure of about 250 atmospheres in the presence of a catalyst comprising essentially the blue oxide of tungsten, the catalyst being prepared by reducing a compound selected from the group consisting of tungstic acid and ammonium paratungstate, the molecular water to olefine ratio being in excess of 1:1, and the olefine feed rate being at least 0.5 kg. per hour per liter of catalyst.

2. A process for the production of secondary butanol which comprises the steps of reacting water and a butene selected from the group consisting of butene-1 and butene-2 at a temperature within the range 230°–270° C. and pressure of about 250 atmospheres in the presence of a catalyst comprising essentially the blue oxide of tungsten, the catalyst being prepared by reducing a compound selected from the group consisting of tungstic acid and ammonium paratungstate, the molecular water to olefine ratio being in excess of 1:1, and the olefine feed rate being at least 0.5 kg. per hour per liter of catalyst.

3. A process for the production of tertiary butanol and secondary butanol which comprises reacting a mixture of water, isobutene and a normal butene at a temperature within the range 160°–220° C. and pressure of about 250 atmospheres in the presence of a catalyst comprising essentially the blue oxide of tungsten, the catalyst being prepared by reducing a compound selected from the group consisting of tungstic acid and ammonium paratungstate, the molecular water to olefine ratio being in excess of 1:1, and the olefine feed rate being at least 0.5 kg. per hour per liter of catalyst, separating tertiary butanol from the reaction products and causing the residual butene-containing mixture to undergo reaction in the presence of a second portion of the same catalyst at a temperature within the range of from 230°–270° C. to produce secondary butanol, the pressure, water-olefine ratio, and olefine feed rate in the latter reaction corresponding to those employed in the former reaction.

NORMAN LEVY.
ROBERT KAY GREENHALGH.

REFERENCES CITED

The following references are of record in the file of this patent:

UNITED STATES PATENTS

| Number | Name | Date |
|---|---|---|
| 1,873,536 | Brown et al. | Aug. 23, 1932 |
| 1,907,317 | Brown et al. | May 2, 1933 |
| 2,042,212 | Deanesly | May 26, 1936 |
| 2,070,258 | Coleman et al. | Feb. 9, 1937 |
| 2,075,204 | Joshua et al. | Mar. 30, 1937 |
| 2,118,882 | Francis | May 31, 1938 |
| 2,173,187 | Tanner | Sept. 19, 1939 |
| 2,184,235 | Groll et al. | Dec. 19, 1939 |
| 2,211,302 | Turkevich et al. | Aug. 30, 1940 |

OTHER REFERENCES

Mellor: "Comprehensive Treatise of Inorganic and Theoretical Chemistry," vol. 11, page 745, pub. by Longmanns, Green & Co., London, 1931.

FIAT, Final Report 968 (P. B. 78,277) April 2, 1947 (Kammermeyer and Carpenter) Abstracted in Journal of Industrial and Engineering Chemistry, vol. 40, No. 9 (Sept., 1948), p. 1620.